(12) United States Patent
Yhr

(10) Patent No.: US 11,627,187 B2
(45) Date of Patent: Apr. 11, 2023

(54) VEHICLE NETWORK

(71) Applicant: Volvo Truck Corporation, Gothenburg (SE)

(72) Inventor: Hamid Yhr, Gråbo (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/666,751

(22) Filed: Feb. 8, 2022

(65) Prior Publication Data

US 2022/0263900 A1 Aug. 18, 2022

(30) Foreign Application Priority Data

Feb. 17, 2021 (EP) ..................................... 21157532

(51) Int. Cl.
*G06F 15/16* (2006.01)
*H04L 67/12* (2022.01)

(52) U.S. Cl.
CPC .................................... *H04L 67/12* (2013.01)

(58) Field of Classification Search
CPC ....................................................... H04L 67/12
See application file for complete search history.

(56) References Cited

U.S. PATENT DOCUMENTS

| | | |
|---|---|---|
| 2006/0013211 A1 | 1/2006 | Deerman et al. |
| 2017/0033986 A1* | 2/2017 | Anderson ............ H04L 12/4625 |
| 2018/0074841 A1* | 3/2018 | Ravenhill ............ H04L 12/4641 |
| 2021/0266234 A1* | 8/2021 | Barnett, Jr. ............ H04L 47/765 |

FOREIGN PATENT DOCUMENTS

| | | |
|---|---|---|
| DE | 102015209361 A1 | 11/2016 |
| EP | 1694024 A1 | 8/2006 |

OTHER PUBLICATIONS

Jenkins, A. et al., "Sensor Data Collection Through Gateways in a Highly Mobile Mesh Network," 2007 IEEE Wireless Communications and Networking Conference, Mar. 11-15, 2007, IEEE, Hong Kong, China, IEEE, 6 pages.
Extended European Search Report for European Patent Application No. 21157532.9, dated Jul. 26, 2021, 8 pages.

* cited by examiner

*Primary Examiner* — Normin Abedin
(74) *Attorney, Agent, or Firm* — Withrow & Terranova, PLLC

(57) ABSTRACT

A vehicle network comprising a processor; a network switch having a plurality of physical ports, from which two or more of the physical ports are configured as access ports and at least one of the physical ports is configured as a trunk port; a plurality of sensors connected to respective access ports of the network switch, wherein the sensors have preconfigured network addresses; and at least two virtual networks, wherein each virtual network corresponds to a group of access ports, and the sensors connected thereto are addressable within the virtual network by their preconfigured network addresses, wherein each network switch is connected via the trunk port to the processor, and the trunk port is configured to accept communications from the processor directed to the sensors connected to the access ports of the network switch.

15 Claims, 6 Drawing Sheets

VEHICLE NETWORK

RELATED APPLICATIONS

The present application claims priority to European Patent Application No. 21157532.9, filed on Feb. 17, 2021, and entitled "VEHICLE NETWORK," which is incorporated herein by reference in its entirety.

TECHNICAL FIELD

The present disclosure relates to the field of vehicular information and communication technology. It relates in particular to a method and a network for connecting a plurality of vehicle-carried sensors with preconfigured network addresses.

BACKGROUND

Present-day vehicles are equipped with a considerable number of electronic sensors. Proprietary as well as standardized buses, including Controller Area Network (CAN) and Ethernet-based solutions, have been proposed for the establishment of data connections between the sensors and centralized or local processors in the vehicle. In such networks, the IP address is the customary way of addressing a sensor, and also the way in which a communication from the sensor can be distinguished from communications sent by other sensors.

It can be expected in every vehicle that multiple sensors of the same type are going to be installed, e.g., two cameras for monitoring a right and a left side of the vehicle. It is also common practice to source the sensors in large numbers from external suppliers, whereby all sensors of the same type are configured with identical IP addresses. Installing such sensors—with factory settings unchanged—in a vehicle produces a situation similar to that in FIG. 1. Here, all six lidars 120 of the vehicle combination 111, 112 are potential recipients of a communication directed to IP address 192.168.9.1. The fate of such a communication is unpredictable: the network infrastructure (implicit in FIG. 1) may consider the communication to have been duly delivered as soon as one lidar 120 has acknowledged it, and terminate further delivery efforts. Likewise, a processor receiving an inbound communication with sensor data from IP 192.168.9.1 cannot ascertain from which one of the lidars 120 it originated. Similar problems are foreseeable for the seven cameras 121, all with IP address 192.168.10.1.

It is possible, though time-consuming and therefore not economically attractive during assembly or repair, to reconfigure the sourced sensors with mutually different IP addresses prior to installation. If the factory settings specify distinct MAC addresses or other hardware addresses, those addresses may be a basis for distinguishing the sensors, although a manual effort is normally needed to map the sensors' MAC addresses to their positions in the vehicle. For instance, it must be worked out which MAC address belongs to the right-front lidar 120.RF and which MAC address belongs to the left-front lidar 120.LF. Manual intervention of this kind is needed as well if, after the sensors have been connected to the vehicle network, a bootstrapping-type algorithm is executed by which the preconfigured IP addresses are modified into (pseudo)random unique IP addresses. Another possibility is to use a partial solution to the addressing problem (e.g., inbound addressing is solved but not outbound, or vice versa) and combine it with time-staggered transmission or listening slots separated by sufficient guard periods. Still further technical measures for avoiding or solving IP address conflicts are proposed in US2017033986 and DE102015209361.

XP031097655 (A. Jenkins et al., "Sensor data collection through gateways in a highly mobile mesh network", proceedings of the IEEE Wireless Communications and Networking Conferences 2007, pages 2788-2789) addresses the requirement that widely distributed sensors must discover paths back to sensor monitoring stations (SMSs) possibly through sparsely connected and mobile networks. The paper describes an architecture and protocol for sensor data collection through a highly mobile ad-hoc network (MANET) that may never experience end-to-end connectivity between a sensor and an SMS, so that a "gateway ferry scenario" may arise. For this purpose, special gateway nodes are responsible for routing messages to their intended destination(s). These gateway nodes, which may be mobile, qualify their links and announce their status to the MANET. Also described are terminus nodes, which carry out network address and port translation (NAPT) between its MANET side and sensor side.

SUMMARY

One objective of the present disclosure is to make techniques and devices available by which a plurality of sensors with preconfigured network addresses can be connected to a processor. It is a further objective to enable such connection while at least some positional information of the sensors is preserved. It is a further objective to connect the sensors by means of non-specialized and/or affordable network infrastructure components. It is a still further objective to propose solutions which are easily scalable with respect to the number of sensors. Finally, it is an objective to adapt the proposed solutions for a vehicular use case.

These and other objectives are achieved by the invention as defined in the independent claims. The dependent claims relate to advantageous embodiments.

In a first aspect of the invention, there is provided a method of connecting a plurality of vehicle-carried sensors to a processor, wherein the sensors have preconfigured network addresses at the time of execution of the method. The method comprises: connecting the sensors to physical ports of one or more network switches of a vehicle network; establishing at least two virtual networks corresponding to different groups of one or more physical ports, wherein the sensors connected thereto can be addressed by their preconfigured network addresses; and establishing at least one trunk port for each network switch and at least one access port for each virtual network, wherein the trunk port accepts communications from the processor directed to the connected sensors.

Because this method separates sensors with identical network addresses into different virtual networks, they can be connected to the processor in their preconfigured condition without giving rise to address conflicts. When the sensors have been connected in this manner, the processor upstream can direct a communication to a specific sensor by submitting the communication to the trunk port while indicating the intended sensor's virtual network; the network switch can then be configured to route this communication to the access port and, thus, into the corresponding virtual network where the sensor is addressable by its preconfigured network address. For communications sent by the sensor towards the processor, this transfer process can be mirrored to allow the processor to distinguish sensor data reported by identical copies of a sensor type that are installed at different positions in the vehicle. The method further allows efficient handling of positional data in the installation process, since each physical port has a well-defined position and/or identity in relation to the network switch, which can be correlated with wiring and other installations in the vehicle in a straightforward fashion.

In some embodiments, two or more network switches are arranged in a daisy-chain topology via their trunk ports. The daisy chain may be linear or branched. Such arrangement may be achieved, in some implementations, by connecting the processor to the trunk port of a first one of the network switches and connecting the trunk port of a second one of the network switches to a further trunk port of the first network switch. In other implementations, the trunk port of one of the network switches may be connected to a trunk port of another one of the network switches. The use of a daisy-chain topology permits the number of available access ports (and thus, the number of access ports) to be multiplied by adding one or more further network switches. This allows a greater number of sensors to be connected, even if the sensors have identical pre-configured network addresses, since a greater number of virtual networks can be established. The adding of a further network switch is typically more cost-efficient than replacing an existing network switch with a more sophisticated switch that has an increased number of physical ports, as purchasing sophisticated equipment drives cost.

In some embodiments, a virtual network may correspond to multiple physical ports; it must then be made sure that no two sensors with identical preconfigured network addresses are connected to the same virtual network. In other embodiments, as a safeguard against this scenario, there is exactly one access port per virtual network.

In a second aspect of the invention, there is provided a vehicle network comprising: a processor, one or more network switches, a plurality of sensors and at least two virtual networks. The virtual networks may be established as a result of configuring the network switches and/or the processor. The one or more network switches each has a plurality of physical ports, from which two or more of the physical ports are configured as access ports and at least one of the physical ports is configured as a trunk port. The sensors are connected to respective access ports of the network switches, and they have preconfigured network addresses. Each of the virtual networks corresponds to an access port or a group of access ports, and the sensors connected thereto can be addressed within the virtual network by their preconfigured network addresses. Further, each network switch is connected via the trunk port to the processor, and the trunk port is configured to accept communications from the processor directed to the sensors connected to the access ports of the network switch.

The second aspect of the invention shares the advantages of the first aspect and can be implemented with a corresponding degree of technical variation.

In the present disclosure, a "physical port" of a network switch refers to a connection interface to the switch which a predefined position or port identity. In this sense, physical ports differ from virtual (logical) ports, which can be assigned to or associated with physical ports rather freely by configuring the network switch accordingly. A physical port may be a permanent connection (e.g., optical fibers spliced by soldering) or a releasable connector (e.g., RJ45, USB or RS-232 connector).

As used herein, "a communication" may be a message, a packet, a datagram or similar information unit susceptible of transmission in a data network.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figure 1:
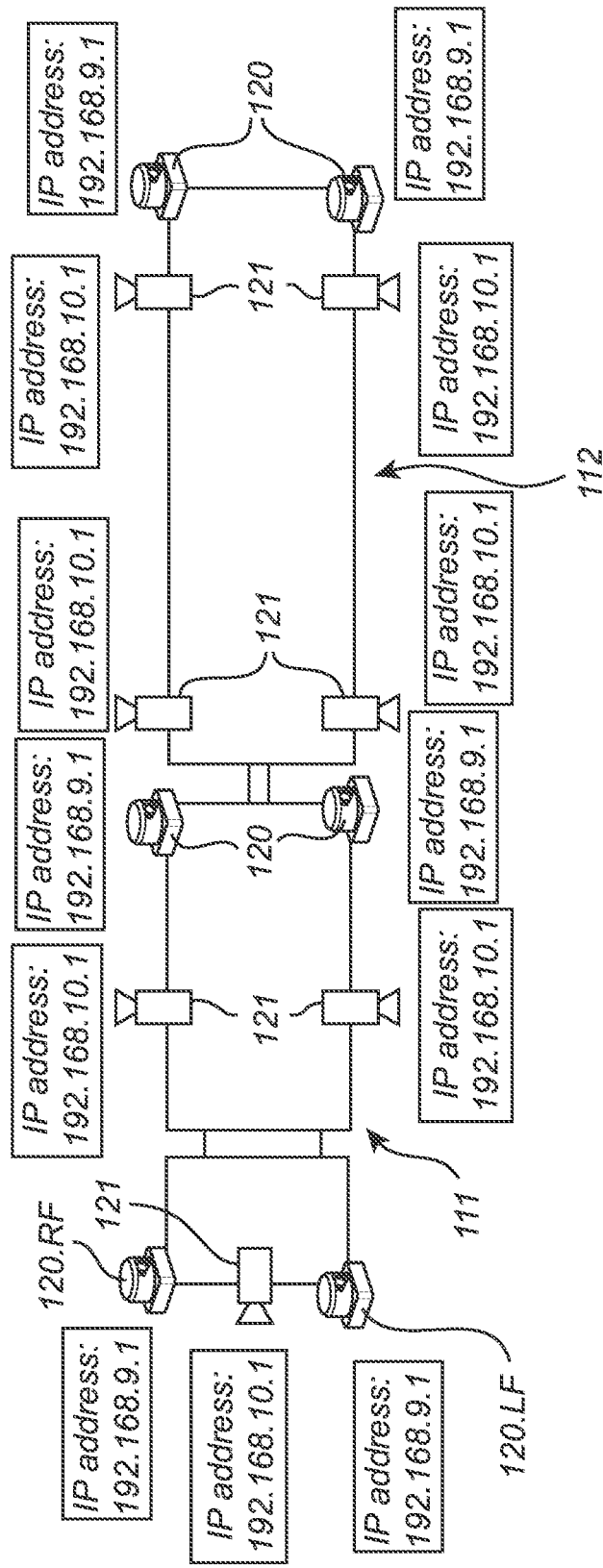
FIG. 1 is a schematical top view of a vehicle combination, in which sensors with their preconfigured IP addresses have been installed.

FIG. 1 is a top view of a vehicle combination composed of a tractor 111 and a trailer 112, in which sensors constituted by six lidar (light detection and ranging) units 120 and seven cameras 121 overlooking different angles around the vehicle combination have been installed with their preconfigured (preprogrammed) IP addresses 192.168.9.1, 192.168.10.1 unchanged. To allow centralized monitoring and/or analysis of the sensor data, the sensors 120, 121 are to be connected to a common vehicle network. As explained above, this may lead to IP address conflicts.

Figure 2:
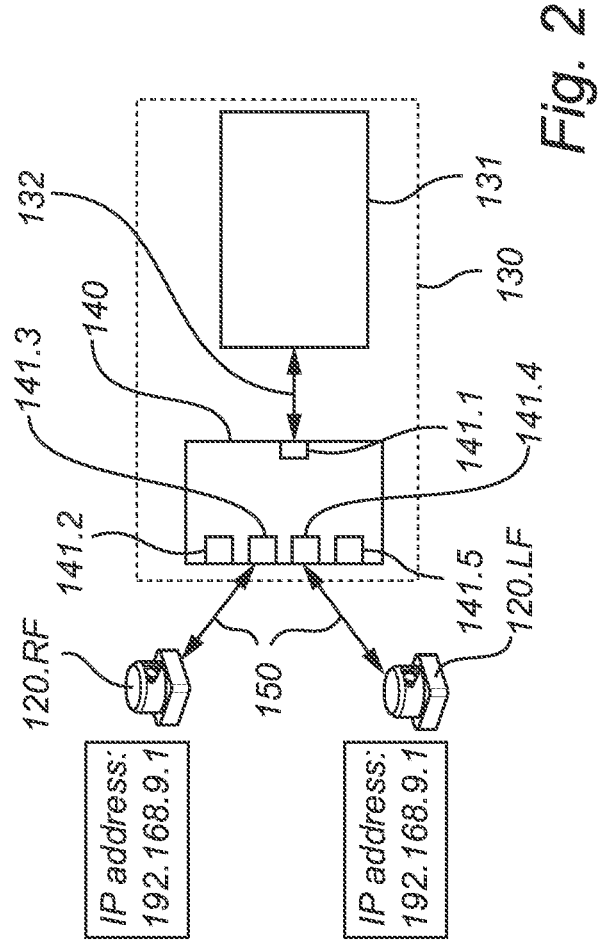
FIG. 2 shows a detail of a vehicle network, where two sensors with identical network addresses and a processor are connected to physical ports of a network switch.

The address conflict problem is illustrated in detail in FIG. 2, which shows an embedded system 130 including a processor 131 and a network switch 140. The processor 131 may act as a vehicle unit computer (VUC) or as a local processor in the vehicle combination. Software executed by a local processor may be referred to as embedded software. The network switch 140 comprises a plurality of physical ports 141, wherein the processor 131 is connected via an internal connection 132 to a first physical port 141.1 and the right-front lidar 120.RF and left-front lidar 120.LF are connected via an external connection 150 to respective third and fourth physical ports 141.3, 141.4. The further physical ports 141.2, 141.5 of the network switch 140 are presently unused. The physical ports 141 may be undifferentiated, whereby the internal 132 and external 150 connections are of an identical type, such as Ethernet. Alternatively, the first physical port 141.1 facing the processor 131 may be adapted to maintain a different type of connection than the remaining physical ports 141.2, 141.3, 141.4, 141.5 facing the sensors 120.

Figure 3:
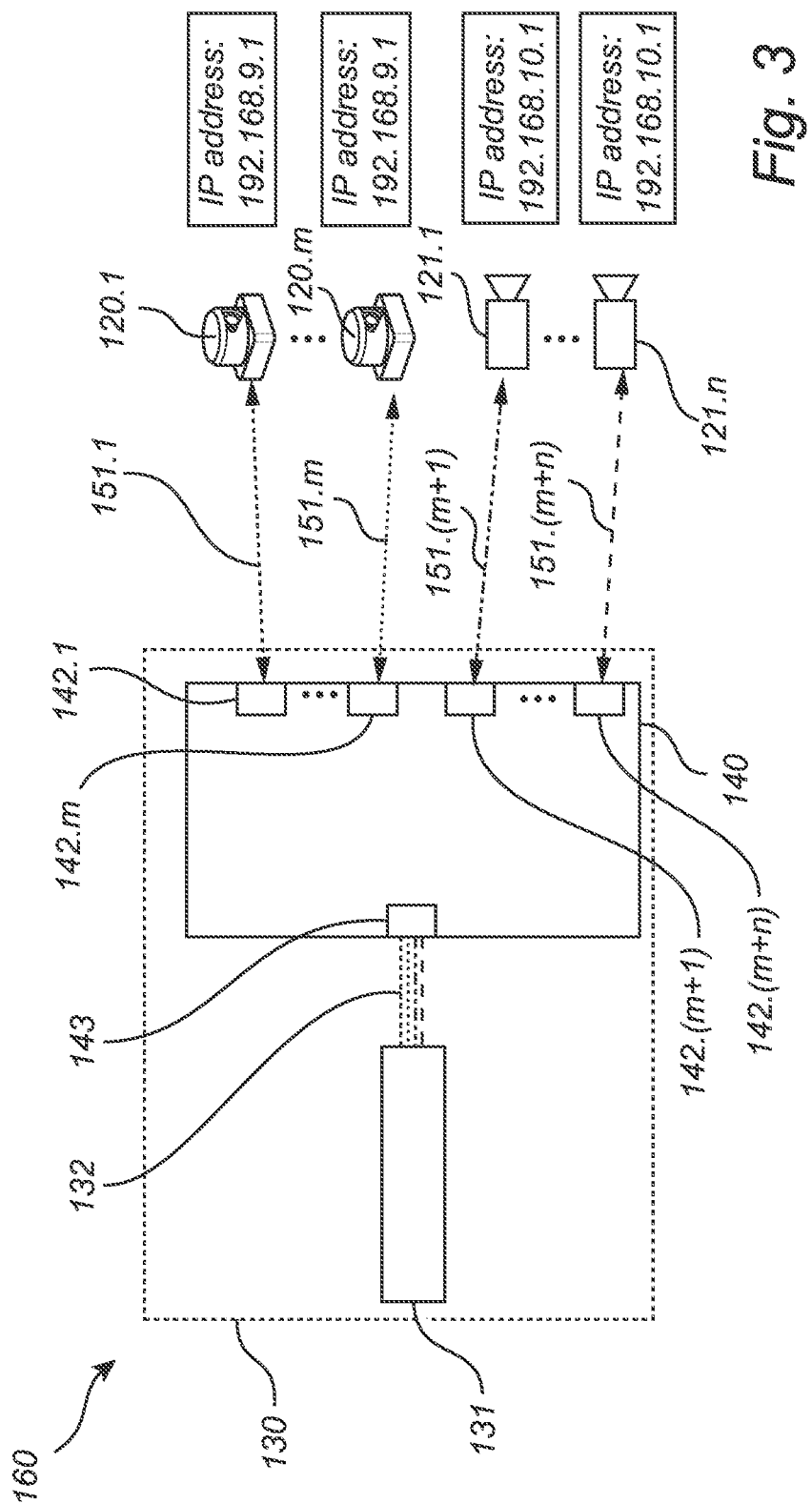
FIG. 3 shows a detail of a vehicle network, where groups of sensors with identical network addresses and a processor are connected to physical ports of a network switch and, in accordance with an embodiment of the invention, a number of virtual networks have been configured.

As shown in FIG. 3, according to an embodiment of the invention, structures like the one in FIG. 2 can be configured to establish a virtual network 151 for each physical port to which a sensor is connected, termed access port 142. In the example illustrated in FIG. 3, there are m lidars 120 and n cameras 121. The virtual networks 151 may be virtual local-area networks (VLANs). Each virtual network 151 corresponds to a separate namespace, so that the preconfigured IP address of each sensor 120 is unique within the virtual network 151 even if it is globally nonunique in the sense that sensors 120, 121 elsewhere in the vehicle combination may use the same IP address. The remaining physical port of the network switch 140 is configured as a trunk port 143.

This configuration makes a unique logical communication path available between the processor 131 and each sensor 120, as illustrated by the differently styled dashed lines which continue from the connections 132 into the virtual networks 151. More precisely, the network switch 140 carries out the configured mapping between access ports 142 and virtual networks 151. Further, an operating system or application software executing in the processor 131 may maintain a table that maps each virtual network 151 to a sensor 120, 121 identified not only with respect to its type but also its position and responsibilities in the vehicle combination. The table may be based on bookkeeping indicating, for instance, that the first physical port 151.1 is connected to wiring towards the right-front lidar position. The table may optionally specify a unique identifier for each installed sensor 120, 121 to which application software or scripts can refer conveniently, such as lidar_front_right. The processor 131 and network switch 140 thereby maintain the following bidirectional chain of correspondences:

physical port↔virtual network↔installed
sensor↔sensor identifier.

FIG. 3 shows the switch 140 as a component of the embedded system 130. However, the switch 140 may be standalone equipment in other embodiments.

Figure 6:
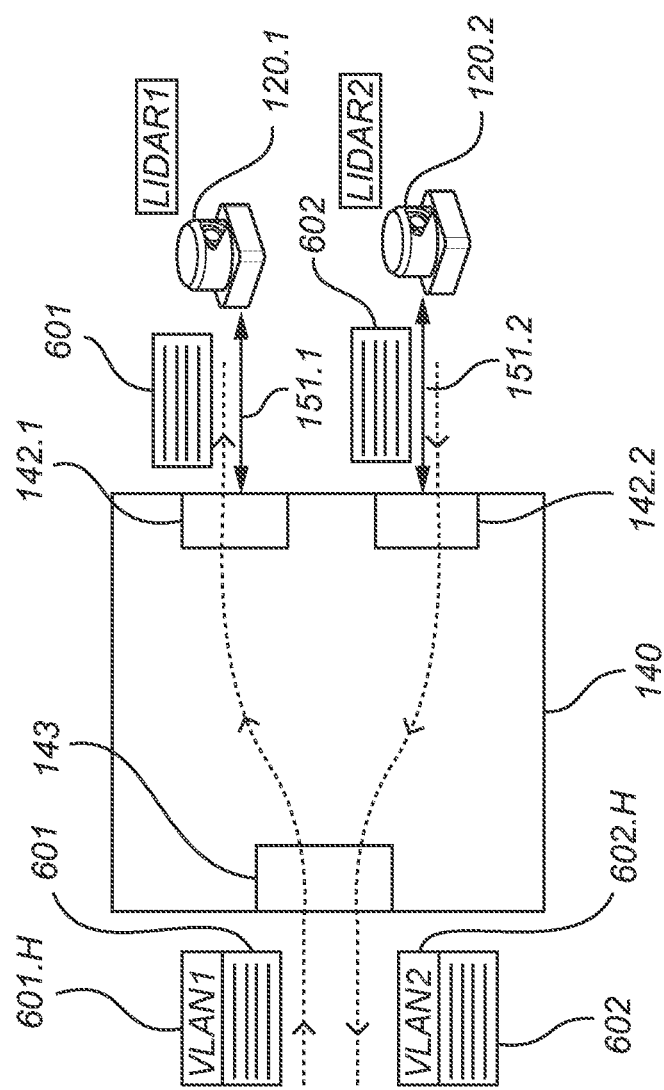
FIG. 6 illustrates, in accordance with an embodiment of the invention, the routing of outbound communications and tagging of inbound communications by means of a network switch.

FIG. 6 illustrates processes in the network switch 140. On the one hand, the network switch 140 may be configured for routing of outbound communications. In one embodiment, the network switch 140 reads a field 601.H in a communication 601 which it receives at the trunk port 143 and routes these on the basis of the value of that field 601.H. The field 601.H may be contained in a header (preamble) or footer of the communication 601, including a physical-layer header or footer. If the field 601.H has a value corresponding to the first virtual network 151.1, the network switch 143 routes the communication 601 to the corresponding access port 142.1. The field 601.H is preferably removed by the network switch 140 before the communication is passed to the virtual network 151.1. In the illustrated example, to make a call to a first lidar 120.1 to which an identifier "LIDAR1" has been assigned, an application executing in the processor 131 reads—or causes an operating system to read—from the above-mentioned correspondence table that this lidar is to be found in the virtual network 151.1 identified as "VLAN1". Accordingly, the field 601.H is set to "VLAN1", and the network switch 140 will carry out this routing. For this purpose, the network switch 140 may rely on a table that maps the virtual networks' 151 identities to corresponding access ports 142 on the basis of current configuration settings.

On the other hand, the network switch 140 may perform tagging of inbound communications. In one embodiment, the network switch 140 processes a communication 602 that it receives at an access port 142 by adding a field 602.H which identifies the virtual network 151 corresponding to that access port 142. The network switch 140 then outputs the communication 602 at the trunk port 143. The field 602.H may be of the same type as the field 601.H which is used for routing. In the example shown in FIG. 6, the communication 602 originates from the second virtual network 151.2, to which a lidar 120.2 labeled "LIDAR2" is connected. The network switch 140 will assign the value "VLAN2" to the field 602.H since that virtual network 151 corresponds to the second access port 142.2. The network switch 140 may read this correspondence from a table.

While not explicitly shown in FIG. 6, the network switch 140 may be configured to process inbound communications generated by the first lidar 120.1 in the same manner as for the second lidar 120.2, and it may perform routing of outbound communications towards both lidars 120.1, 120.2.

The embodiment where inbound communications are tagged is of high practical relevance in applications where pollable sensors are used. A pollable sensor may be configured to buffer the measurement data that it generates until it receives a request to transmit the measurement data. In a vehicle network where pollable sensors are installed, such transmit requests may be broadcast to all sensors on a periodic, event-triggered or ad hoc basis. For technical reasons, this broadcasting may be performed sequentially, by sending the transmit request to one virtual network after another. The fact that many sensors may respond to such request in a short time interval is not necessarily inconvenient, as the network switch 140 will ensure that the inbound communications are correctly tagged with corresponding virtual network identities.

The tagging of inbound communications is useful also in application where the sensors are configured to initiate transfer of data periodically. For instance, the processor 131 may be unaware of a sensor's IP address and MAC address when the vehicle network 160 is initialized for the first time. The processor 131 may nevertheless need to contact the sensor to configure it in a particular manner. In this situation, the option of sending a broadcast message (e.g., to a specified virtual network 151) may be more convenient than a unicast message, which could require knowledge of one of these addresses.

Figure 4:
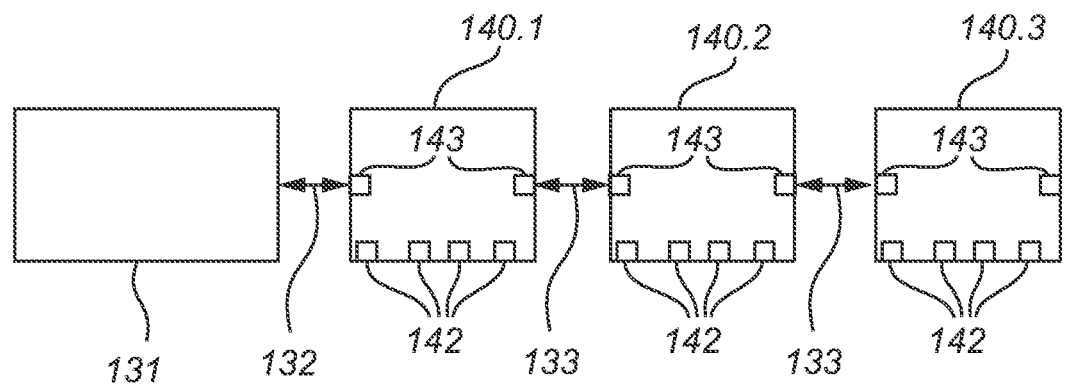
FIG. 4 shows a processor connected to three network switches in a daisy-chain arrangement, in accordance with an embodiment of the invention.

FIG. 4 illustrates a detail of a vehicle network, according to an embodiment, where the processor 131 is connected to three network switches 140.1, 140.2, 140.3 connected in a daisy-chain arrangement via their trunk ports 143. At least the inner network switches 140.1, 140.2 include at least two trunk ports 143. In general terms, the daisy-chain arrangement may be created—or extended—by connecting a trunk port 143 of one network switch 140 to a trunk port 143 of another network switch 140. More precisely, this process may include connecting the processor 131 to a first trunk port of the first network switch 140.1 and connecting a further trunk port 143 of the first network switch 140.1 to the trunk port 143 of the second network switch 140.2. While not explicitly shown in FIG. 4, it is understood that if a network switch 140 has three trunk ports 143, two of these may be used to connect two outer network switches 140 and the remaining trunk port 143 may be used to connect the processor 131 or to connect an inner network switch 140. The resulting, branched topology is understood to be a daisy-chain topology in the terminology of this disclosure. Arranging multiple network switches 140 connected via their trunk ports 143 provides a large number of physical ports (and thus, a large number of access ports 142), and does so in a manner which is generally less costly than using a single network switch 140 equipped with the same number of physical ports.

In the daisy-chained network switches 140, the trunk ports 143 belong to one namespace, which is separate from the namespaces constituted by the virtual networks at the access ports 142. The network switches 140 may implement a network protocol by which a communication, which the processor 131 injects at the first network switch's 140.1 left trunk port 143 and which carries a field indicating a virtual network identity (e.g. "VLAN9"), shall first be matched against the identities of the virtual networks at the access ports 142 of the first network switch 140.1; if no matching virtual network is found, the communication is passed on to the second network switch 140.2, where matching against the identities of the virtual networks at the access ports 142 of the second network switch 140.2 is initiated, and so forth.

Figure 5:
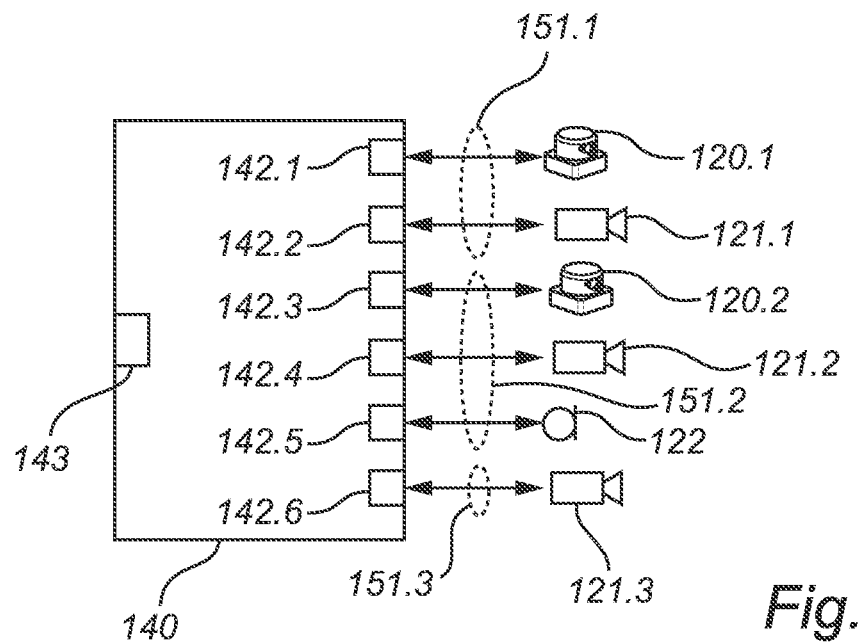
FIG. 5 shows a network switch configured to provide three virtual networks, respectively corresponding to two, three and one physical port, in accordance with an embodiment of the invention.

FIG. 5 illustrates a topology where one virtual network 151 may correspond to a group of one or more access ports 142. The network switch 140 in FIG. 5 is configured to provide a first virtual network 151.1 corresponding to the first and second access ports 142.1, 142.2, a second virtual network 151.2 corresponding to the third, fourth and fifth access ports 142.3, 142.4, 142.5, and a third virtual network corresponding to the sixth access port 142.6. Because multiple access ports 142 per virtual network 151 are allowed, a network address conflict may arise if the same virtual network 151 is used to connect two sensors of the same type, i.e., lidar 120, camera 121 or transducer 122 (provided these types have distinct preconfigured network addresses). As illustrated, this has been avoided in FIG. 5, so that each of the virtual networks 151 will be operable to handle inbound and outbound communications.

Figure 7:
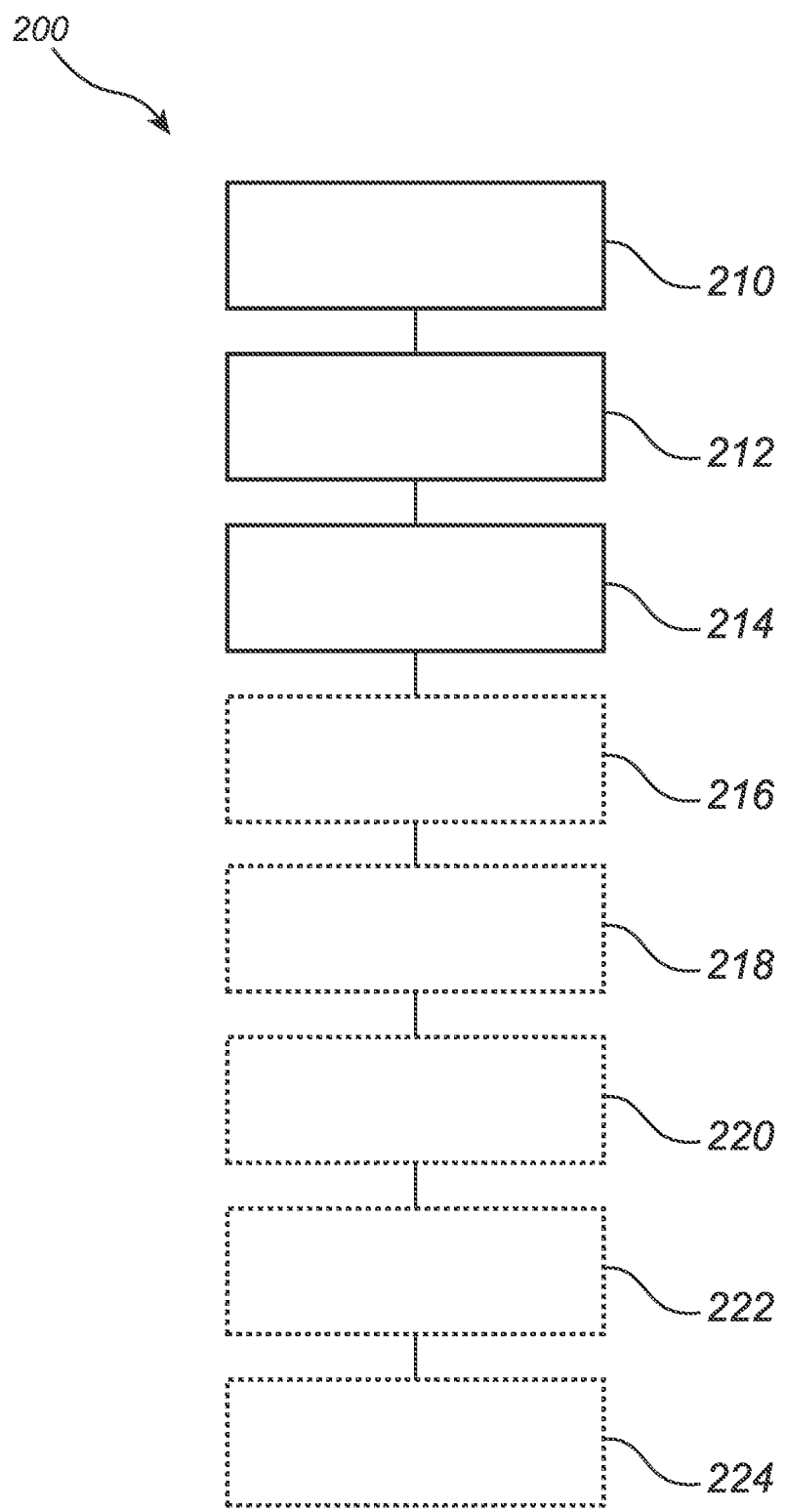
FIG. 7 is a flowchart of a method of connecting a plurality of sensors with preconfigured network addresses to a processor, in accordance with an embodiment of the invention.

FIG. 7 is a flowchart of a method 200 for connecting a plurality of vehicle-carried sensors 120, 121 (cf. FIG. 3) with preconfigured network addresses to a processor 131. The method 200 may be carried out by an operator or in an automated or semi-automated way. As announced initially, the steps, although referred to below by ordinal numbers "first", "second" etc., need not be executed in this sequence.

In a first step 210 of the method 200, the sensors 120, 121, 122 are connected to physical ports 141 of one or more network switches 140 of a vehicle network 160.

In a second step 212, at least two virtual networks 151 corresponding to different groups of one or more physical ports 141 are established. The sensors 120, 121 connected to a physical port 141 are addressable by their preconfigured network addresses within that virtual network 151.

In a third step 214, at least one trunk port 143 for each network switch 140 and at least one access port 142 for each virtual network 151 are established. The trunk port 143 is such as to accept communications from the processor 131 directed to the connected sensors 120, 121. The status as access port or trunk port is assigned to the physical ports 141 as a result of configuration.

An optional fourth step 216 includes configuring the network switch 140 to route communications 601 that enter through the trunk port 143 to an access port 142 on the basis of an indication 601.H of a virtual network identity.

An optional fifth step 218 includes configuring the network switch 140 to tag communications 602 that enter through one of the access ports 142 with an indication 602.H of a virtual network identity of the virtual network 151 corresponding to that access port 142.

To establish a daisy-chain topology of network switches 140, the method 200 may include an optional sixth step 220, wherein the processor 131 is connected to the trunk port 143 of a first one 140.1 (cf. FIG. 4) of the network switches, wherein at least two trunk ports 143 are established for the first network switch 140.1. For the same purpose, the method 200 may further include a seventh step 222, where the trunk port 143 of a second one 140.2 of the network switches is connected to a further trunk port 143 of the first network switch 140.1. For the same purpose, the method 200 may still further include an eight step 224, in which the trunk port 143 of one of the network switches 140 is connected to a trunk port 143 of another one of the network switches 140.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of connecting a plurality of vehicle-carried sensors with preconfigured network addresses to a processor, comprising:
   connecting the sensors to one or more physical ports of one or more network switches of a vehicle network;
   establishing at least two virtual networks corresponding to different groups of the one or more physical ports, wherein the sensors connected thereto are addressable by their preconfigured network addresses;
   establishing at least one trunk port for each network switch and at least one access port for each virtual network, wherein the trunk port accepts communications from the processor directed to the connected sensors;
   connecting the processor to a first trunk port of a first network switch of the one or more network switches, wherein the first network switch comprises the first trunk port and a second trunk port; and
   connecting the trunk port of a second network switch of the one or more network switches to the second trunk port of the first network switch.

2. The method of claim 1, further comprising:
   configuring at least one of the one or more network switches to route communications that enter through the trunk port to an access port on the basis of an indication of a virtual network identity.

3. The method of claim 1, further comprising:
   configuring at least one of the one or more network switches to tag communications that enter through the access ports with an indication of a virtual network identity.

4. The method of claim 1, wherein exactly one access port is established for each virtual network.

5. The method of claim 1, wherein the network address is an Internet Protocol (IP) address.

6. The method of claim 1, wherein the virtual network is a Virtual LAN (VLAN).

7. The method of claim 1, wherein the vehicle-carried sensors are located in one vehicle or one vehicle combination.

8. A vehicle network comprising:
a processor;
one or more network switches, each having a plurality of physical ports, from which two or more of the plurality of physical ports are configured as access ports and at least one of the plurality of physical ports is configured as a trunk port;
a plurality of sensors connected to respective access ports of the network switches, wherein the sensors have preconfigured network addresses; and
at least two virtual networks, wherein each virtual network corresponds to an access port or a group of access ports, and the sensors connected thereto are addressable within the virtual network by their preconfigured network addresses,
wherein:
each network switch is connected via the trunk port to the processor, and the trunk port is configured to accept communications from the processor directed to the sensors connected to the access ports of the network switch;
the processor is connected to a first trunk port of a first network switch of the one or more network switches; and
a second trunk port of the first network switch is connected to a trunk port of the second network switch of the one or more network switches.

9. The vehicle network of claim 8, wherein at least one of the one or more network switches is configured to route communications that enter through the trunk port to an access port on the basis of a field indicating a virtual network identity.

10. The vehicle network of claim 8, wherein at least one of the one or more network switches is configured to extend communications that enter through the access ports with a field indicating a virtual network identity.

11. The vehicle network of claim 8, wherein the first network switch and the second network switch are arranged in a daisy-chain topology via their trunk ports.

12. The vehicle network of claim 8, wherein the network address is an Internet Protocol, (IP) address.

13. The vehicle network of claim 8, wherein the virtual network is a Virtual LAN (VLAN).

14. The vehicle network of claim 8, wherein the vehicle-carried sensors are located in one vehicle or one vehicle combination.

15. The vehicle network of claim 8, wherein:
the first trunk port and the second trunk port belong to a first namespace; and
the access ports each belong to other respective namespaces separate from the first namespace.

* * * * *